March 15, 1966 J. PICKLES 3,240,464
ADJUSTABLE SUPPORT FOR VEHICLE SEAT
Filed May 7, 1965 3 Sheets-Sheet 1
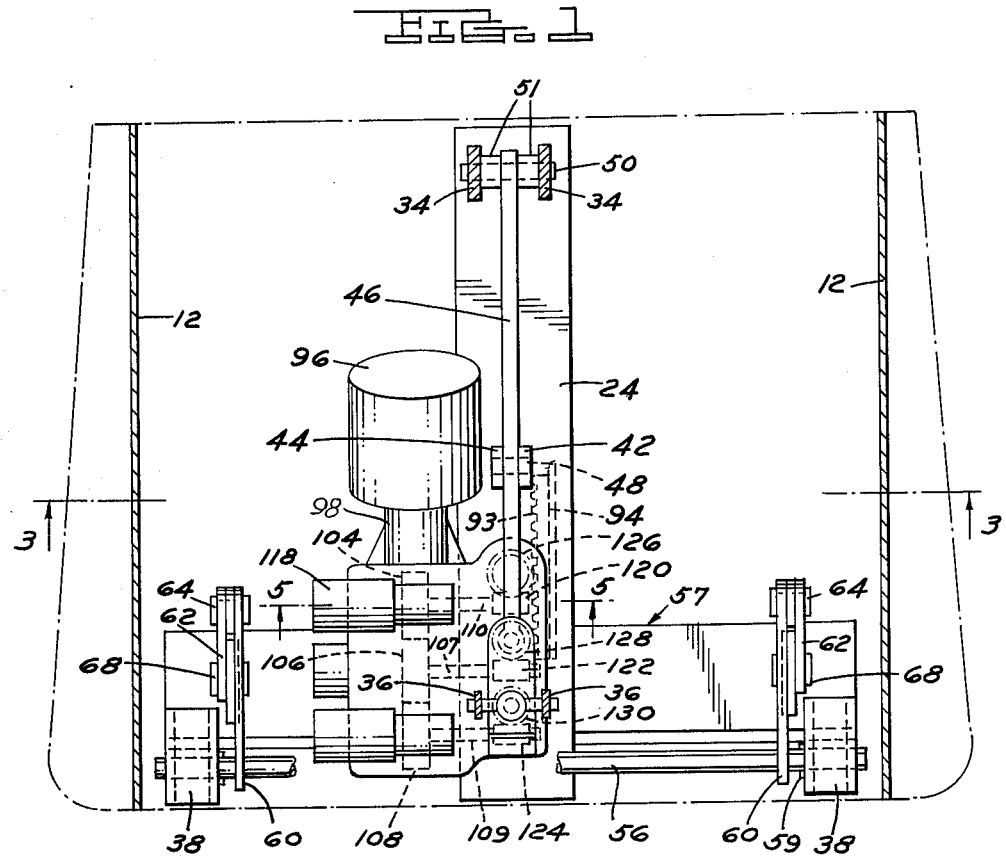
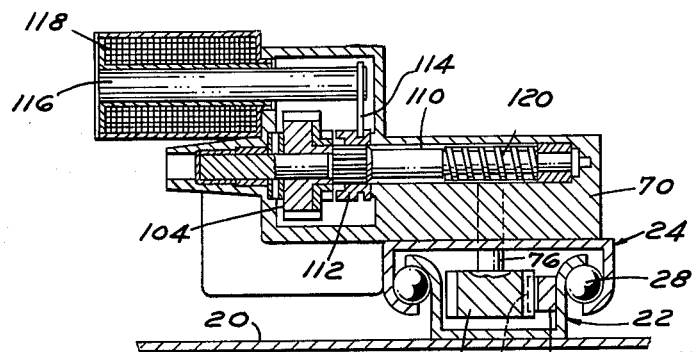
INVENTOR.
JOSEPH PICKLES
ATTORNEYS March 15, 1966 J. PICKLES 3,240,464
ADJUSTABLE SUPPORT FOR VEHICLE SEAT
Filed May 7, 1965 3 Sheets-Sheet 2
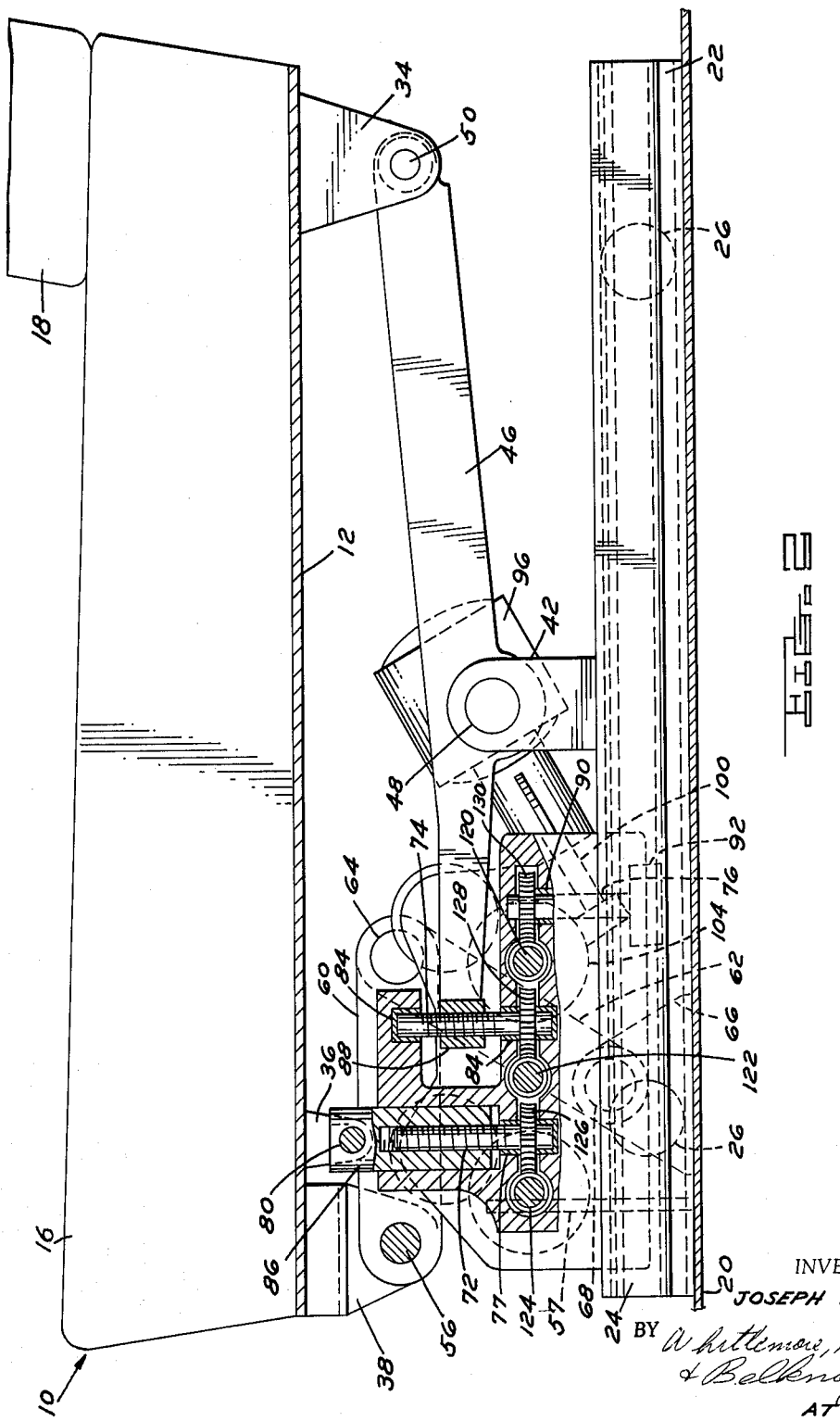
INVENTOR.
JOSEPH PICKLES
BY Whittemore, Hulbert
& Belknap
ATTORNEYS March 15, 1966 J. PICKLES 3,240,464
ADJUSTABLE SUPPORT FOR VEHICLE SEAT Filed May 7, 1965 3 Sheets-Sheet 3

INVENTOR.
JOSEPH PICKLES
BY
ATTORNEYS

United States Patent Office 3,240,464
Patented Mar. 15, 1966

3,240,464
ADJUSTABLE SUPPORT FOR VEHICLE SEAT
Joseph Pickles, Dearborn, Mich., assignor to Ferro Manufacturing Corporation, a corporation of Michigan
Filed May 7, 1965, Ser. No. 456,041
19 Claims. (Cl. 248—419)

This is a continuation-in-part of application Serial No. 337,282, filed January 13, 1964.

The present invention relates to a seat adjuster and more particularly, relates to a power operated seat adjusting mechanism.

It is an object of the present invention to provide a power-operated seat adjusting mechanism particularly adapted for a single passenger "bucket" type of seat, wherein the seat is located in close proximity to the floor pan of the vehicle.

It is a further object of the present invention to provide a power-operated seat adjusting mechanism of the aforementioned type wherein the power actuating unit is carried entirely by the movable track of the single track structure.

It is still a further object of the present invention to construct and arrange a minimum number of quality manufactured parts or elements in a manner facilitating long wear of the elements subjected to repeated load stress.

It is a further object of the present invention to provide a power-operated seat adjusting mechanism of the aforementioned type which is compactly arranged to economically utilize the limited space provided between a vehicle seat and the floor pan.

It is a further object of the present invention to provide a power-operated seat adjusting mechanism comprising a seat frame, a fixed support, adjustment means for moving the seat frame longitudinally comprising stationary track means connected to the fixed support and movable slide means connected to the seat frame slidably mounted on the track means, anti-friction means between the track and slide means, an upwardly extending bracket on the slide means intermediate the ends thereof, an elongated lever arranged substantially parallel to and directly above the track means, said lever having an intermediate portion thereof pivotally connected to the bracket, means connecting the rear end of the lever to the rear end portion of the seat frame, operating means including a housing carried by the slide means on the front side of the bracket and including power devices such for example as three vertically extending shafts, a pair of screws connected to two of said shafts including screws, nuts supported on the screws for longitudinal movement thereon, means fixedly connecting one of the nuts to the front end portion of the seat frame and the other of the nuts to the front end of the lever, a horizontally extending rack carried by the stationary track means, a pinion carried by the third shaft engageable with the rack, and power operated actuating means carried by the slide means to effect selective rotation of said shafts to independently vertically displace the front and rear of the seat frame and to effect independent horizontal movement of the slide means and seat frame with respect to the stationary track means.

It is a further object of the present invention to provide a structure of the aforementioned type wherein the track means constitute the only track structure for the seat frame, said track structure being located adjacent the transverse center of the seat frame.

It is a further object of the present invention to provide a structure of the aforementioned type wherein the power operated actuated means includes a single reversible motor which is utilized in conjunction with selectively operable control means for effecting the desired adjustments.

It is a further object of the present invention to provide a structure of the forementioned type wherein the power operated actuating means includes a single motor, a plurality of gears in mesh with each other, drive means between the motor and one of the gears, and selectively operable clutch means for clutching each of the gears independently to a shaft on which it is mounted.

It is a further object of the present invention to provide a simplified low cost structure of the aforementioned type having certain advantages contributing to efficiency, reliability and long life as well as ease of maintenance.

Other objects and features of the invention will become apparent as the description proceeds, especially when taken in conjunction with the accompanying drawings, illustrating a preferred embodiment of the invention, wherein:

FIGURE 1 is a plan view of the power operated seat adjusting mechanism, with the seat and part of the frame removed.

FIGURE 3 is a view taken substantially on the line 3—3 of FIGURE 1.

FIGURE 5 is a side elevation of the structure shown in FIGURE 4, with parts broken away and in section.

The present invention relates to a seat supporting and adjusting construction designed primarily for use in supporting a so-called "bucket" type of seat of an automobile. The seat supporting and adjusting mechanism comprises a single track structure located at the transverse center of the seat frame. The adjustments contemplated are essentially up and down movement of the front edge of the seat, up and down movement of the rear edge of the seat, and substantially front to rear adjustment of the seat. It will of course, be understood that simultaneous adjustment of the front and rear edges of the seat either upwardly or downwardly results in vertical adjustment of the seat as a unit, whereas adjustment of one independently of the other results primarily in effecting a tilting adjusting of the seat.

Figure 2:
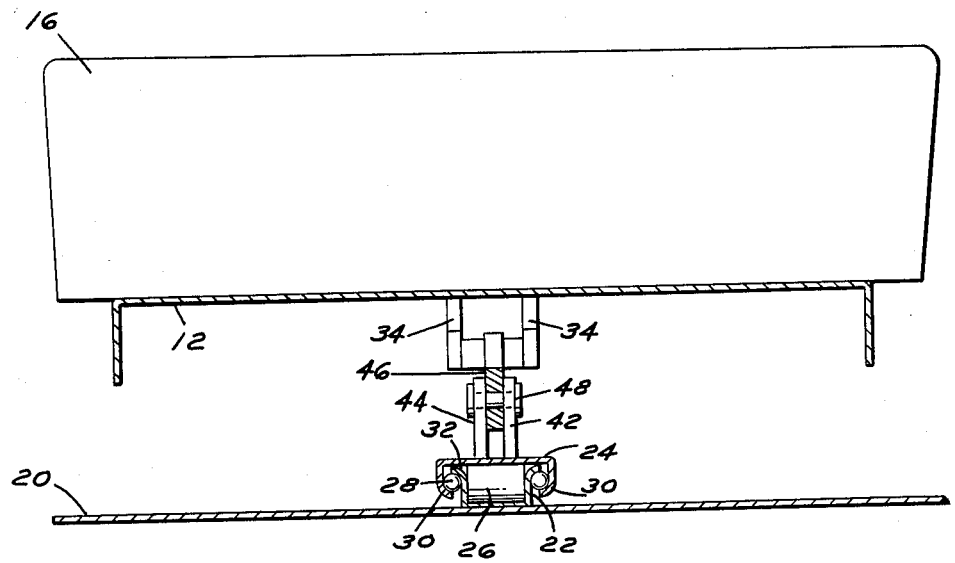
FIGURE 2 is a side elevation, partly in section, of the power operated seat adjusting mechanism.

Referring now to the drawings, FIGURES 1–3 illustrate a single passenger seat of the "bucket" type used in modern automobiles. The seat is provided with a frame 12 which has a seat cushion 16 and seat back 18 mounted thereon. The frame 12 is supported for longitudinal movement on a single centrally located track structure.

The floor pan 20 of the automobile forms a fixed support upon which the stationary elongated channel-shaped track 22 is directly mounted by bolts or other means (not shown). A movable elongated channel-shaped slide 24 is slidably mounted on the fixed track 22 and is connected to the seat frame 12 at the front and rear thereof by means to be subsequently described. As shown in FIGURE 1, the entire seat track structure extends longitudinally of the seat frame 12 adjacent the transverse center thereof.

The construction of the channel-shaped track 22 and slide 24 and the means for facilitating the sliding movement of the slide is well known in the art. Between the track 22 and slide 24 and near each end thereof there is a roller 26 for bearing the bulk of the vertical load and near each end of the track 22 and slide 24 there are antifriction balls 28 carried in recesses formed by the two pairs of elongated complementary bent flanges 30 and 32 provided on the track and slide members 22 and 24 respectively, as best illustrated in FIGURE 3.

The rear edge of the seat frame 12 is provided with a pair of centrally located downwardly extending brackets 34. The front edge of the seat frame 12 is provided with a pair of centrally located downwardly extending brackets 36 and at opposite ends of the seat is provided a pair of brackets 38 which are used for a purpose to be subsequently described. Approximately midway between the axis of the slide 24 is provided a pair of upstanding brackets 42 and 44. An elongated lever 46 is provided which has an intermediate portion thereof pivoted to the brackets 42 and 44 by means of a pivot pin 48 as illustrated in FIGURE 2. The rear end of the arm or lever 46 is pivotally connected to the pair of brackets 34 by means of a pivot pin 50. Spacing elements 51 are carried by the pin 50 between the brackets 34 and the lever 46. The other end of the lever 46 receives an adjustable non-rotatable nut as will subsequently be described. The pivot pin 48 is located approximately two-thirds of the way from the end of the lever 46 mounted on the pivot pin 50, as best illustrated in FIGURE 2.

A stabilizing bar 56 is connected between the seat frame 12 and the floor 20 in order to prevent the seat from turning around the centrally disposed single track structure and to provide stability for the seat 10. As shown in the drawings, the stabilizing bar 56 extends transversely of the seat frame 12 adjacent the front edge thereof and is connected to opposite sides of the seat frame 12 by the brackets 38 which, as previously mentioned, depend from the seat frame 12. The bracket 38 have aligned openings which rotatably receive the ends of the stabilizing bar 56. The collar 59 is secured on each end portion of the bar 56 adjacent bracket 38 for preventing lengthwise movement of the stabilizing bar 56.

An elongated L-shaped bracket 57 is located beneath the seat 10 near the front edge thereof. The horizontal flange of the bracket 57 is secured to the floor 20 by means of bolts (not shown). A rearwardly extending lever 60 is provided adjacent each end portion of the stabilizing bar 56. One end of each lever 60 is fixedly secured to the stabilizing bar while the other end, which is free, is pivotally connected to the upper end of a link 62 by means of a pivot pin 64. Each link 62 is pivotally connected on the lower end thereof by means of a pivot pin 68 to a support 66 which is fixedly mounted on the bracket 57. The levers 60 and links 62 permit fore and aft adjustment of the seat 10 without jamming the stabilizing bar 56.

The location of the stabilizing bar 56 adjacent the front edge of the seat 10 permits the use of any reasonable length of seat. When the seat 10 is at its forward extremity, to the left as viewed in FIGURE 2, the vertical load on the seat 10 is effectively distributed to the sides of the seat 10 by the stabilizing bar 56. In addition, the stabilizing bar 56 provides lateral stability for the seat 10 so as to prevent turning movement thereof around the tracks 22 and 24. It should be noted when referring to FIGURE 2 that the greater part of the space underneath the back of the seat 10 is unobstructed. This space is available for the feet of a person utilizing the back seat in the automobile.

Mounted on the movable slide 24 is a housing 70 for the power transmission. Enclosed within the housing 70 are two vertically extending rotatable threaded lead screw support members or jacks 72 and 74 and a vertically extending rotatable shaft 76. The screw 72 has the lower end mounted for rotation in a bushing 77. The other end of the screw 72 has thereon an elongated vertically displaceable nut member 86, the upper end of which is connected to the downwardly depending brackets 36 provided on the seat frame 12 by means of a pin 80. The screw 74, which has both ends mounted in bushings 84 for rotation in the housing 70 has vertically displaceable thereon a threaded nut 88 which is fixedly carried by the front end of the arm 46 as best illustrated in FIGURE 2. Finally, the rotatable shaft 76 is mounted in a bushing 90 and on the lower end thereof is provided with a pinion 92 which engages the teeth 93 of an elongated rack 94. The rack 94 is carried by a side flange provided on the stationary track member 22. Means are provided for rotating the two screws 72 and 74 and the shaft 76 independently.

Figure 4:
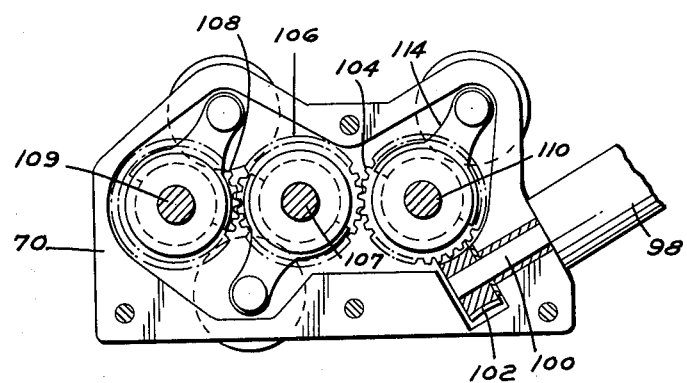
FIGURE 4 is an end view of the selectively operable power transmission with the cover removed.

Referring now to FIGURES 1, 4 and 5, the mechanism for effecting selective adjustment of the seat is illustrated. Power is derived from a motor 96 having a drive shaft connected through a suitable coupling 98 to an input shaft 100 of the clutch controlled transmission. The shaft 100 carries a drive gear 102 in mesh with a driven gear 104 which in turn meshes with a gear 106, the latter being in constant mesh with the third gear 108. Accordingly, when the motor 96 is energized, the gears 104, 106 and 108 all rotate in mesh.

Each of the gears 104, 106 and 108 is rotatable upon its supporting drive shaft, as best seen in FIGURE 5 wherein one of the gears such for example as the gear 104, is shown as freely rotatable on drive shaft 110. Keyed to the drive shaft 110 for rotation therewith and for limited shifting movement thereon is a clutch element 112 connected by a fork 114 to the armature 116 of a solenoid indicated generally at 118. It will be understood that when the solenoid 118 is energized to move the armature 116 to the left, the clutch element 112 engages correspondingly shaped clutch teeth on the gear 104 and hence, rotation is imparted to the shaft 110. In addition, gears 106 and 108 are mounted on shafts 107 and 109 respectively and are also provided with solenoid operated clutch elements like gear 104. Carried by the aforesaid three drive shafts (such as the drive shaft 110) mounting the gears 104, 106 and 108, are worms 120, 122 and 124 in mesh respectively with worm gears 130, 128 and 126 which are carried by the rotatable shaft 76 and screws 74 and 72 as above described.

In operation, the seat 10 may be adjusted horizontally by manipulation of suitable control mechanism that actuates the electrical motor 96 and the appropriate solenoid operated clutch element 112. As a result thereof, the clutch element 112 is shifted to the left, as viewed in FIGURE 5, to engage the gear 104 which is driven by the motor driven gear 102. As a result thereof the shaft 110 which carries a worm 120 is rotated so as to rotate the worm gear 130 in engagement therewith. The rotation of the worm gear 130 is effective to rotate the shaft 76 and pinion 92 along the rack 94 in the desired fore or aft direction. Thus, the movable track 24 is moved horizontally so as to selectively adjust the seat 10. It should be noted that the operating and actuating mechanisms contained in housing 70 are carried entirely by the movable slide 24. The stabilizing bar 56 is effective to prevent turning movement of the seat frame 10 with respect to the single track structure.

The provision of the rack 94 fixedly carried by the stationary track 22 permits an extremely compact arrangement between the horizontal drive means and the track members.

Suitable control mechanism also permits individual or simultaneous actuation of the vertically movable nut means provided on the rotatable screw members 72 and 74 upwardly or downwardly so that the seat 10 may be uniformly elevated or the front or back of the seat 10 may be individually elevated by actuation of the motor 96 and the corresponding solenoid operated clutch element.

Assuming that it is desirable to lift the front of the seat 10, the motor 96 is energized which in turn drives the gear 102. Rotation of the gear 102 drives the three gears 104, 106 and 108 which are in meshed engagement. Simultaneously, the clutch mechanism corresponding to gear 108 is actuated so as to engage the teeth thereon. This is effective to rotate the shaft 109, which carries a worm 124. Rotation of the worm 124 drives the worm gear 126 which in turn rotates the screw 72. Rotation of the screw 72 in one direction is effective to raise the nut 86 provided thereon thereby raising the front edge of the seat 10.

When it is required to raise the back edge of the seat 10 the suitable control mechanism is actuated which drives the motor 96 and gear 92, the last mentioned element driving the three gears which are in mesh. Simultaneously, the corresponding solenoid operated clutch mechanism is actuated so as to connect the clutch element to the gear 106. This results in the shaft 107 which carries the worm 122 being driven in rotation. Rotation of the worm 122 rotates the worm gear 128 and the rotatable screw 74 thereby displacing the nut member 88 in a downward direction. The downward displacement of the nut 88 pivots the lever 46 about pivot pin 48 so as to raise the back end of the seat 10. All of the operating mechanism is conventionally reversible to permit reverse movement of the seat 10.

It will be appreciated that the aforedescribed mechanism greatly improves existing seat structures as to compactness and reduction in total number of operating parts in that the basic operating mechanism for vertical adjustment of the whole seat comprises a minimum of two substantially parallel screw supporting members and a nut device for each of the members that is drivingly engaged with the seat support frame to raise and lower the seat. In addition, the horizontal drive mechanism is an improvement over previous apparatuses in that the rack member is carried by the stationary rack closely adjacent the floor and a pinion drive is associated therewith.

While the mechanism for effecting vertical adjustment of the seat is herein illustrated as comprising a pair of screw jacks, and the mechanism for effecting horizontal adjustment is herein illustrated as comprising a rack and pinion mechanism, it will of course be appreciated that mechanisms such as piston and cylinder devices, cranks or the like, may be employed without departing from the basic inventive concept.

The drawings and the foregoing specification constitute a description of the improved adjustable support for vehicle seats in such full, clear, concise and exact terms as to enable any person skilled in the art to practice the invention, the scope of which is indicated by the appended claims.

What I claim as my invention is:

1. A seat adjuster mechanism comprising a seat frame, a fixed support, adjustment means for moving said seat frame longitudinally comprising stationary track means connected to said fixed support and a movable slide connected to said seat frame slidably mounted on said stationary track means, anti-friction means between said track means, an upwardly extending bracket carried by said slide intermediate the front and rear ends thereof, an elongated lever arranged substantially parallel to said track means and slide, said lever having an intermediate portion thereof connected to said bracket, means connecting the rear end of said lever to the rear end portion of said seat frame, operating means carried by said movable slide forwardly of said bracket and including a housing and a pair of vertically extending screw jack means comprising screws mounted in said housing, vertically displaceable nuts supported on said screws for longitudinal movement thereon, means connecting one of said nuts to the front end portion of said seat frame and the other of said nuts to the front end of said lever, and actuating means to effect independent relative rotation between each of said nuts and the screw on which it is mounted to independently vertically displace the front and rear of said seat frame.

2. A seat adjuster mechanism comprising a seat frame, a fixed support, adjustment means for moving said seat frame longitudinally comprising stationary track means connected to said fixed support and a movable slide connected to said seat frame slidably mounted on said stationary track means, anti-friction means between said track means, an upwardly extending bracket carried by said slide intermediate the ends thereof, an elogated lever arranged substantially parallel to said track means and slide, said lever having an intermediate portion thereof connected to said bracket, means connecting the rear end of said lever to the rear end portion of said seat frame, operating means carried by said slide forwardly of said bracket and including a housing, two screw jack means including vertical screws which are mounted in said housing and a rotatable vertically extending shaft mounted in said housing, vertically displaceable nuts supported on said two screws for longitudinal movement thereon, means connecting one of said nuts to the front end portion of said seat frame and the other of said nuts to the front end portion of said lever, a rack carried by said stationary track means, a pinion carried by said shaft engageable with said rack, and actuating means operatively connected to said jack and said shaft to effect independent movement of said nuts to independently vertically displace the front and rear of said seat frame and to effect independent rotation of said pinion to provide horizontal movement of said slide and seat frame on said stationary rack means.

3. The seat adjuster mechanism defined in claim 2 wherein said track means constitutes a single track structure for said seat frame, said track structure being located adjacent the transverse center of said seat frame.

4. The seat adjuster mechanism defined in claim 3 wherein a transversely extending stabilizing bar is connected to said seat frame adjacent opposite sides thereof, and movable linkage means connecting said stabilizing bar to said support, said stabilizing bar and said linkage means providing lateral stability for said seat frame so as to prevent turning of said seat frame around the longitudinal axis of said track structure.

5. The seat adjuster mechanism defined in claim 2 wherein said operating means and said actuating means are carried entirely by said slide.

6. The seat adjuster mechanism defined in claim 2 wherein said lever is mounted directly above said slide.

7. The seat adjuster mechanism defined in claim 2 wherein said actuating means includes a worm gear mounted on each of said screws and said rotatable shaft, a worm for each worm gear, and means for selectively driving said worms.

8. The seat adjuster mechanism defined in claim 2 wherein the pivot axis of said lever is located closer to the front end thereof than to the rear end thereof.

9. A power operated seat adjuster mechanism comprising a seat frame, a fixed support, a single track structure for moving said seat frame longitudinally comprising a stationary track connected to said fixed support and a slide conected to said seat frame adjacent the transverse center thereof, said slide being slidably mounted on said stationary track, anti-friction means between said track and slide, a bracket carried by said slide intermediate the ends thereof, an elongated lever having an intermediate portion thereof pivotally connected to said bracket, means connecting the rear end of said lever to the rear end portion of said seat frame, operating means carried by said slide including a pair of screw jack means comprising screws and relatively displaceable nuts supported on said screws, means connecting one of said nuts to the front end portion of said seat frame and the other of said nuts to the front end of said lever, and power operated actuating means to effect independent movement of said nuts relative to said screws to independently vertically displace the front and rear of said seat frame.

10. The power operated seat adjuster mechanism defined in claim 9 wherein a transversely extending stabilizing bar is connected to said seat frame adjacent opposite sides thereof, and movable linkage means connecting said stabilizing bar to said support, said stabilizing bar and said linkage means providing lateral stability for said seat frame so as to prevent turning of said seat frame around the longitudinal axis of said track structure.

11. The power operated seat adjuster mechanism defined in claim 9 wherein said operating means and said actuating means are carried entirely by said slide.

12. The power operated seat adjuster mechanism defined in claim 9 wherein said lever is mounted directly above said slide.

13. The power operated seat adjuster mechanism defined in claim 9 wherein said actuating means includes a worm gear mounted on each of said screws, a worm for each worm gear, and means for selectively driving said worms.

14. The power operated seat adjuster mechanism defined in claim 9 wherein the pivot axis of said lever is located closer to the front end thereof than to the rear end thereof.

15. A power operated seat adjuster mechanism comprising a seat frame, a fixed support, a single track structure for moving said seat frame longitudinally comprising a stationary track connected to said fixed support and a slide connected to said seat frame adjacent the transverse center thereof, said slide being slidably mounted on said stationary track, anti-friction means between said track and slide, a bracket carried by said slide intermediate the ends thereof, an elongated lever having an intermediate portion thereof pivotally connected to said bracket, means connecting the rear end of said lever to the rear end portion of said seat frame, operating means carried by said slide including a pair of screw jack means each comprising a screw and a relatively displaceable nut supported on said screw, means connecting one of said nuts to the front end portion of said seat frame and the other of said nuts to the front end of said lever, and power operated actuating means to effect independent movement of said nuts relative to said screws to independently vertically displace the front and rear of said seat frame, a rack carried by said stationary track, said actuating means including a pinion engageable with said rack for moving said slide and seat frame horizontally.

16. A seat adjuster mechanism comprising a seat frame, a single elongated track means extending in front to rear direction centrally of said seat frame, an elongated slide connected to said seat frame and slidable longitudinally on said track means, a lever pivoted intermediate its ends to said slide for swinging movement in a vertical plane containing said track means and slide, power mechanism comprising a pair of lift devices adjacent one end of said slide, one of said devices being connected directly between said slide and the central portion of the adjacent edge of said seat frame, the other of said devices being connected directly between said slide and the adjacent end of said lever, the other end of said lever being connected to the other edge of said seat frame.

17. Mechanism as defined in claim 16 in which said power mechanism comprises a housing including three parallel rotary shafts, motor means for selectively rotating said shafts, said pair of lift devices each comprising a rotary actuating member connected to be rotated by one of said shafts, and rotary drive means connected to the remaining one of said shafts connected between said track means and said slide to effect movement of said slide along said track means.

18. Mechanism as defined in claim 17 in which the rotary drive means comprises a pinion carried by said slide, and a rack mounted in fixed relation to said track means in mesh with said rack.

19. Mechanism as defined in claim 16 in which said power mechanism is mounted adjacent the front end of said slide.

References Cited by the Examiner
UNITED STATES PATENTS

| | | | |
|---|---|---|---|
| 1,684,944 | 9/1928 | Chapman | 248—429 |
| 2,141,093 | 12/1938 | Richter et al. | 248—393 |
| 3,022,975 | 2/1962 | Horton et al. | 248—420 |
| 3,081,973 | 3/1963 | Arlauskas | 248—393 |
| 3,182,947 | 5/1965 | Tanaka | 248—421 |

CLAUDE A. LE ROY, *Primary Examiner.*